United States Patent

[11] 3,623,981

[72] Inventors Jeremy Peter Giltrow
  Bordon;
  Patricia Ann Grattan, Farnborough;
  George Henry Kinner, Aldershot; John
  Keith Lancaster, Reading, all of England
[21] Appl. No. 727,001
[22] Filed May 6, 1968
[45] Patented Nov. 30, 1971
[73] Assignee National Research Development
  Corporation
  London, England
[32] Priority May 4, 1967
[33] Great Britain
[31] 20,693/67

[54] COMPOSITE BEARING MATERIALS
 7 Claims, No Drawings
[52] U.S. Cl. ................................................ 252/12.2,
  29/182.2, 29/182.5, 29/183.5, 29/191, 29/194,
  29/195, 75/200, 75/201, 75/DIG.1, 252/12.4
[51] Int. Cl. .................................................... F16c 33/12
[50] Field of Search.......................................... 175/200,
  200 F, 201; 29/182.2, 182.5, 195.183.5, 194, 191;
  252/12.4, 12.2, 12

[56] References Cited
UNITED STATES PATENTS

| | | | |
|---|---|---|---|
| 3,071,637 | 1/1963 | Hurn ............................ | 136/36 |
| 3,310,387 | 3/1967 | Sump et al. .................... | 29/182.5 |
| 3,437,458 | 4/1969 | Volker ......................... | 29/182.5 |
| 3,473,900 | 10/1969 | Sara ............................ | 29/195 |

OTHER REFERENCES

" Fiber Reinforcement of Metals" Kelly, 1965, London, Her Majesty's Stationary Office " What Engineers Should Know About Self-Lubricating Plastics," Bower, Metal Progress, Vol. 88, No. 3, Sept. 1965

*Primary Examiner*—Benjamin R. Padgett
*Assistant Examiner*—B. H. Hunt
*Attorney*—Larson, Taylor & Hinds ABSTRACT: Composite bearing materials having markedly reduced wear are obtained by incorporating carbon fibers of high tensile strength and Young's Modulus in a metal matrix. Advantageously a lamellar solid, for example molybdenum sulfide, may also be added. These materials may be manufactured by depositing metal by an electroless method on chopped carbon fibers and compacting the composite by heat and pressure, alternatively the composite may be compacted by powder metallurgical methods. The lamellar solid, if required, is added before compacting by heat and pressure.

COMPOSITE BEARING MATERIALS

The present invention relates to composite bearing materials and their manufacture.

Bearing materials are materials which are suitable for use as load-bearing components in sliding or rolling contact with another surface, and which in general have a relatively low coefficient of friction and a low rate of wear. Examples of such load-bearing components include gears, plain bearings, rolling element bearings, machine slideways, and piston rings.

British Pat. Specification No. 1,166,253 describes improved bearing materials based on synthetic resins reinforced with carbon fibers. Although resin-based bearing materials have various advantageous properties such as low wear and low coefficients of friction, they have limited strength particularly at elevated temperatures and are not suitable for various applications e.g. at very high speeds or heavy loads.

According to the present invention a bearing material comprises a metal matrix incorporating carbon fibers.

Preferably the carbon fibers are of high-speed tensile strength and Young's Modulus for example such as are obtained from synthetic polymer fibers by oxidation under tension and followed by carbonization as described in any one of copending Pat. application Ser. Nos. 449,320 filed 19th May 1965 now U.S. Pat. No. 3,412,062 and 593,673 filed 14th Nov. 1965 now U.S. Pat. No. 3,532,466 the disclosures of which are incorporated herein by reference.

The amount of wear of the bearing materials decrease as the proportion of carbon fiber in the composite increases. Usually at least about 12 and up to about 35 percent by volume of carbon fiber. A preferred range is between about 12 and 25 percent by volume of carbon fiber.

The metal/carbon fiber composite bearing material disclosed above may be manufactured directly in the form of a load-bearing component, or a load-bearing component may be machined, formed or otherwise produced from a blank of metal/carbon fiber composite bearing material.

A wide range of metals, which term includes metal alloys, can be reinforced with carbon fibers to produce a metal-bearing material having a lower wear rate than the unreinforced metal-bearing material.

The carbon fibers may be randomly disposed within the metal matrix or may be oriented so that they lie substantially in a direction normal to the bearing surface.

Metal/carbon fiber composite-bearing materials in accordance with the invention may be manufactured by various processes such as the electroless deposition of metals on to chopped fibers prior to hot-pressing into compacts, or conventional powder metallurgy techniques in which powdered metal is mixed with carbon fibers and hot-pressed. Other techniques which may be satisfactory include infiltration of molten metals into fiber mats, electroplating and slip casting.

A further feature of the invention is that metal/carbon fiber composites may be porous, and may be advantageously impregnated with lubricating material. In one preferred form a metal/carbon fiber composite manufactured in accordance with the invention may be impregnated with one or more lamellar solids. For example, graphite or the dichalcogenides of elements in Groups V$a$ or VI$a$ of the periodic table, of which molybdenum disulfide $MoS_2$, is the preferred additive and is normally present to the extent of between about 5 and 15 percent by volume. In a further preferred form a metal/carbon fiber composite is impregnated with a limited amount of a fluid lubricant.

The preparation of some metal/carbon fiber composites manufactured in accordance with the invention will now be described by way of example only. The carbon fibers were produced by a process as described in U.S. Pat. No. 3,412,062 and which have an average diameter of 7.2 microns, and ultimate tensile strength (U.T.S.) of 28,000 lbs./in. in. and a Young's Modulus of 54 million lbs./in. in.

Example 1

A solution of 0.880 ammonia is added to 150 ml. of silver nitrate solution in distilled water (6.5 percent wt.) until the dark brown precipitate originally formed just clears. Drops of additional silver nitrate solution are added until the solution changes to a straw color. At this stage there is an explosion hazard and suitable safety precautions are required. Fifty milliliters of a 14 percent wt. solution of potassium hydroxide is added to the ammoniacal silver nitrate, and then 0.880 ammonia is added dropwise until the solution clears. Further silver nitrate is now added to bring back the straw color.

Chopped carbon fibers (0.2 g.) of average length 0.125 in. are dispersed in the solution and 60 ml. of a solution of 6.5 percent wt. dextrose in water added. Silver is completely deposited on the fibers within about 5 minutes. The plated fibers are filtered, washed in distilled water and alcohol and dried in a vacuum oven at 80° C. The coated fibers are hot-pressed into compacts in a graphite mold at about 600° C. and 2 tons/in.$^2$. The final composition of the composite is 85 percent vol. silver/15 percent vol. carbon fibers.

Example 2

0.55 g. of chopped carbon fibers are immersed in a sensitizing solution of palladium (II) chloride (0.1 g.) in 0.880 ammonia (50 ml.). They are then washed in distilled water and transferred to a bath containing nickel chloride hexahydrate (15 g.), sodium citrate (50 g.) and ammonium chloride (25 g.) in 500 ml. water. This plating solution is contained in a P.T.F.E. or polypropylene beaker and stirred with a polyethylene stirrer. The pH is adjusted to between 8 and 10 with 0.880 ammonia and the temperature maintained between 70° and 80° C.

The fibers are uniformly dispersed in the solution and 25 ml. of a reducing solution of sodium hypophosphite (40 percent wt.) is added. Hydrogen is evolved and the evolution maintained by further additions of nickel chloride and sodium hypophosphite until sufficient nickel is deposited to obtain the desired ratio of metal to carbon fiber. The plated fibers are filtered, washed and vacuum dried at 80° C. They are hot-pressed in a graphite mold at 900° C. and 2 tons/sq. in.

Example 3

A cobalt/carbon fiber composite is prepared by the method described in example 2 using cobalt chloride in the place of nickel chloride.

Example 4

Lead powder of particle size 20$\mu$ is mixed with chopped carbon fiber, in suitable weight proportion, in a liquidizer, filtered and vacuum dried at 80° C. The mixture is hot-pressed at 280° C. at 6 tons/in.$^2$ in a steel mold.

Example 5

A copper/carbon fiber composite is prepared by the method described in example 4 except that the copper/carbon fiber mixture is hot-pressed at 700° C. and 2 tons/in.$^2$.

The compacts produces in accordance with the above examples were cylinders $\frac{3}{8}$ inch diameter and $\frac{1}{2}$ inch long. They were tested for wear by loading one plane end of the cylinder against the curved surface of a 1 inch diameter rotating ring of tough steel (AID 71 B) hardened to 750 V.P.N. The surface of the steel was finished to a roughness of 6$\mu$inch cls, and cleaned with organic solvent. The surface of the compact was prepared by dry abrasion on fine carborundum paper and particular care was taken to avoid contact with any fluid. The volume of wear was calculated from measurements of the diameter of wear scar on the compact at periodic intervals of time. A load of 2 kg. was used, at a speed of sliding of 270 cm./s.

The table shows results obtained at increasing fiber contents given in percent by volume.

The results given in the table show that the rate of wear of all the carbon fiber reinforced metals is progressively reduced by increasing the fiber contents. The results also show that significant reductions are achieved by the presence of carbon fibers.

In spite of this reduction in wear rate there was no significant change in the coefficient of friction of the bearing surfaces in dry condition. The composites are, however, porous and may be impregnated with solid or liquid lubricants to reduce the coefficient of friction.

| | Wear rate, $10^{-10}$ cm.$^3$/ cm. kg. | Percent theoretical density | Coefficient of friction |
|---|---|---|---|
| Silver | 48 | 96 | 0.9 |
| +12% carbon fibre | 17.5 | 91 | 0.8 |
| +25% carbon fibre | 1.0 | 89 | 1.0 |
| Nickel | 180 | 88 | 0.95 |
| +12% carbon fibre | 62.5 | 90 | 1.1 |
| +25% carbon fibre | 16.1 | 73 | 1.0 |
| Cobalt | 55 | 94 | 0.7 |
| +12% carbon fibre | 47 | 90 | 0.85 |
| +25% carbon fibre | 12 | 61 | 1.0 |
| Lead | 1,400 | 100 | 0.95 |
| +12% carbon fibre | 560 | 100 | 0.8 |
| +25% carbon fibre | 26.5 | 100 | 0.8 |
| Copper | 890 | 92 | 1.3 |
| +12% carbon fibre | 140 | 80 | 1.0 |
| +25% carbon fibre | 10 | 79 | 1.1 |

We claim:

1. A bearing component for a bearing comprising two components having bearing surfaces in sliding or rolling contact with one another, the bearing surface of said component comprising a bearing metal matrix in which is incorporated carbon fibers, the amount of the carbon fibers being from about 12 percent to about 35 percent by volume and sufficient to substantially reduce the wear rate of the surface, without substantially changing the coefficient of friction thereof in the dry state.

2. A bearing component according to claim 1 wherein said carbon fibers are high strength, high Young's modulus carbon fibers obtained from synthetic polymer fibers oxidized under tension and subsequently carbonized.

3. A bearing component according to claim 1 wherein said bearing metal is selected from the group consisting of silver, nickel, cobalt, lead and copper.

4. A bearing component according to claim 1 further comprising a lubricant impregnated within said metal matrix.

5. A bearing component according to claim 1 further comprising a lamellar solid selected from the group consisting of graphite and molybdenum sulphide.

6. A bearing component according to claim 5 wherein said lamellar solid comprises molybdenum disulfide in an amount of 5 to 15 percent by volume.

7. A bearing comprising a bearing component according to claim 1.

* * * * *